Figure 1:
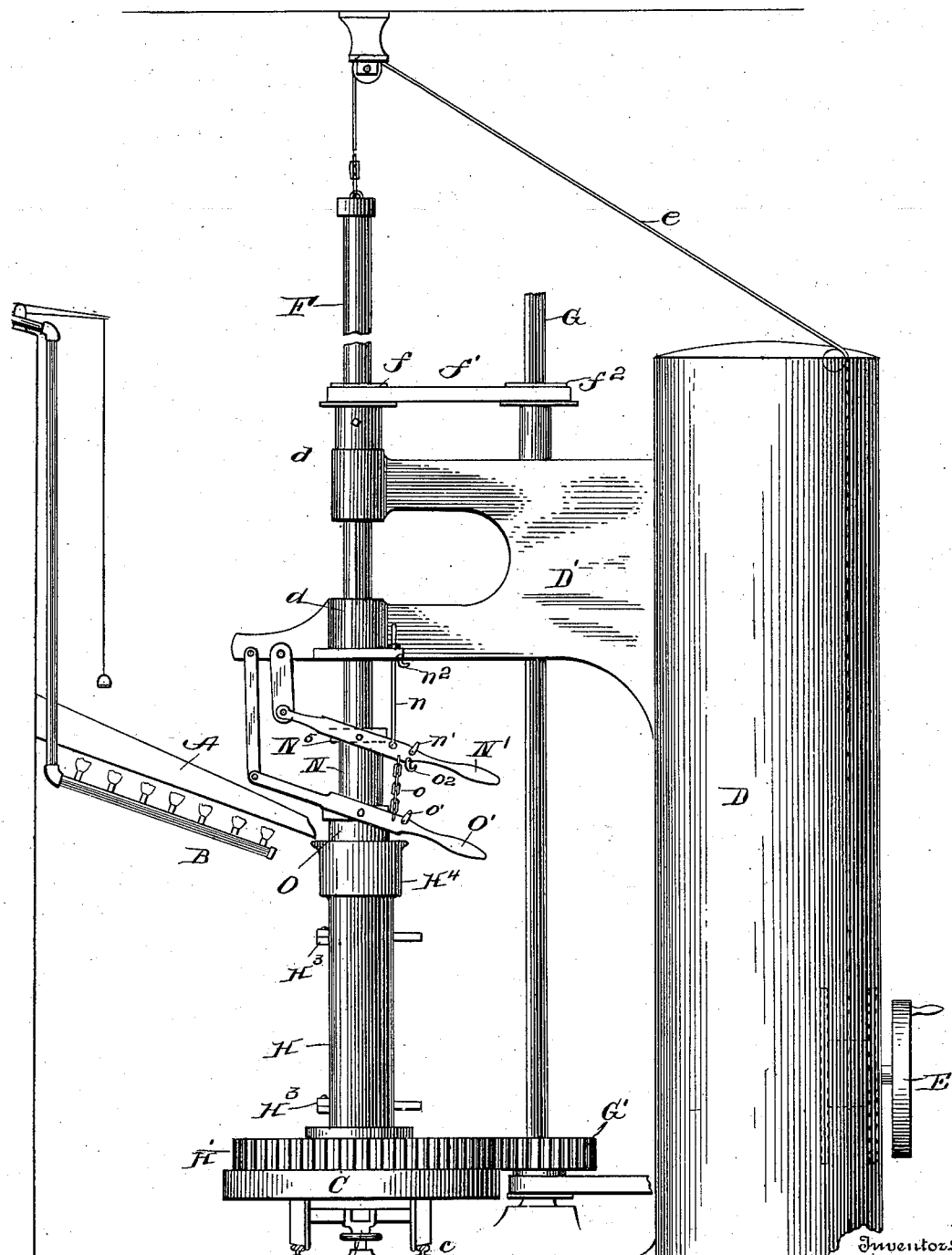

No. 655,235. Patented Aug. 7, 1900.
T. B. HOWE & C. E. WETMORE.
APPARATUS FOR FORMING GLASS OR VITREOUS PIPE OR TUBULAR BODIES.
(Application filed Mar. 16, 1900.)

(No Model.) 3 Sheets—Sheet 1.

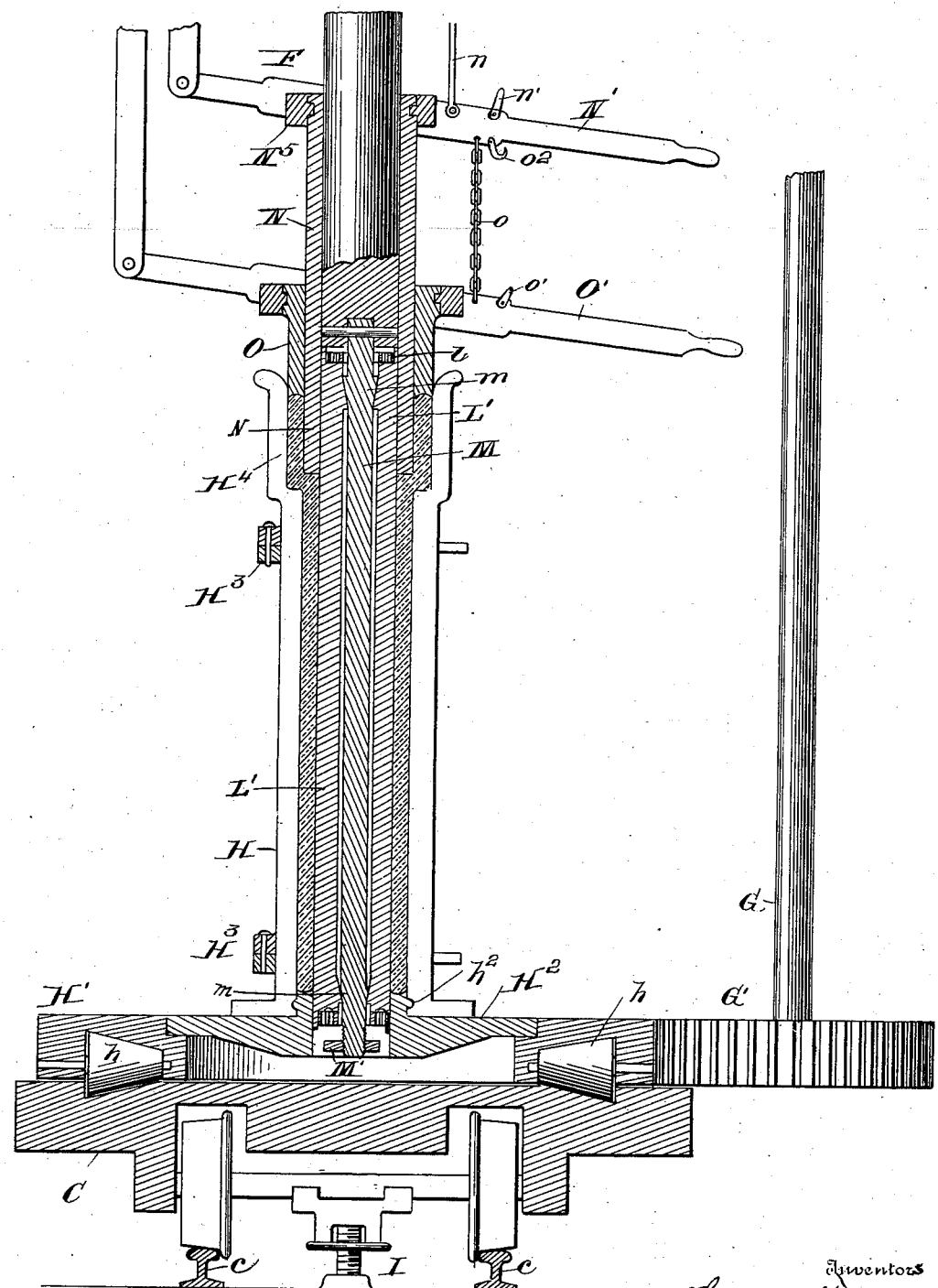

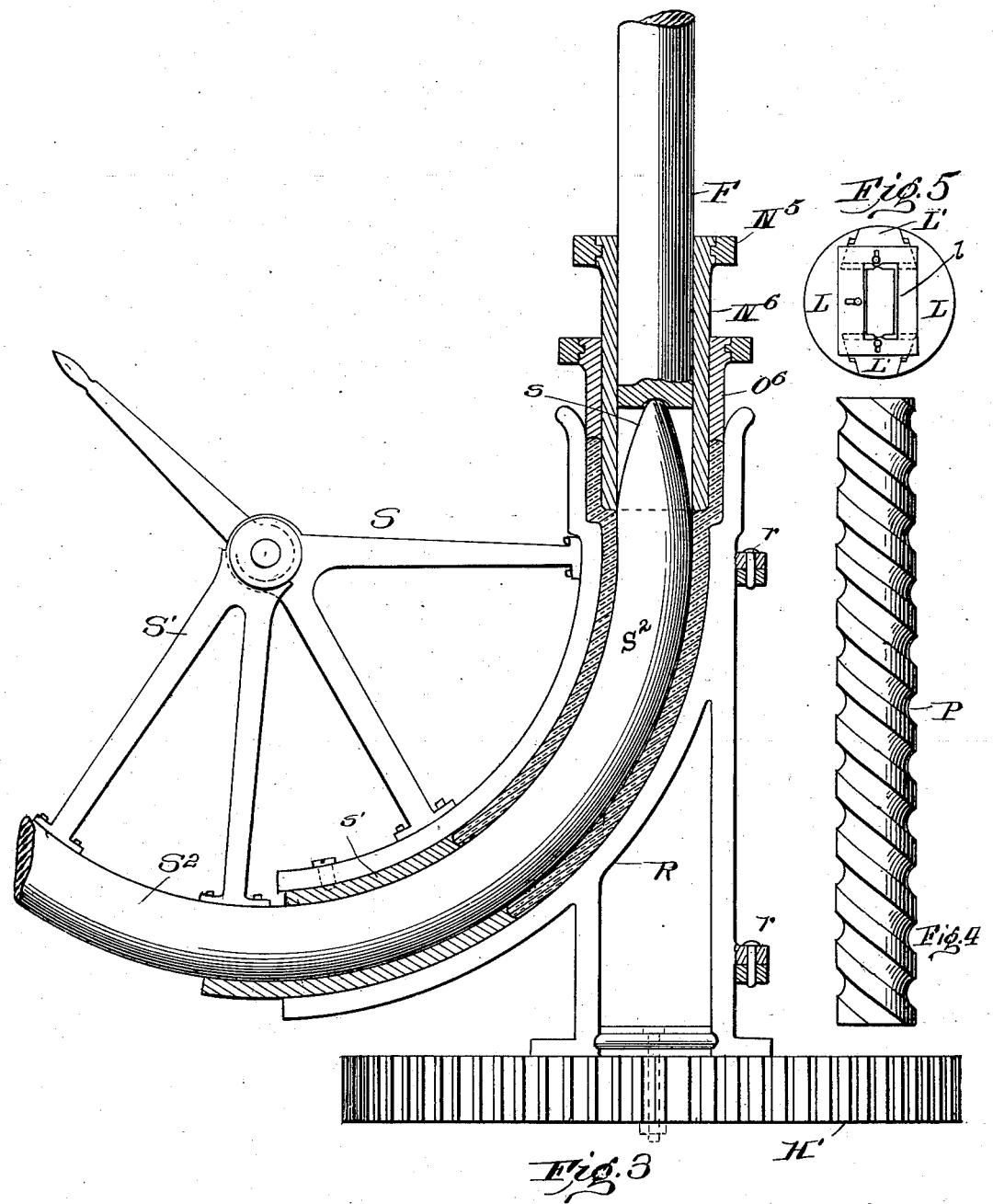

ively of labor and attendance.
UNITED STATES PATENT OFFICE.

THOMAS B. HOWE AND CHARLES E. WETMORE, OF SCRANTON, PENNSYLVANIA.

APPARATUS FOR FORMING GLASS OR VITREOUS PIPE OR TUBULAR BODIES.

SPECIFICATION forming part of Letters Patent No. 655,235, dated August 7, 1900.

Application filed March 16, 1900. Serial No. 8,940. (No model.)

*To all whom it may concern:*

Be it known that we, THOMAS B. HOWE and CHARLES E. WETMORE, citizens of the United States, and residents of Scranton, in the county of Lackawanna and State of Pennsylvania, have invented certain new and useful Improvements in Apparatus for Forming Glass or Vitreous Pipe or Tubular Bodies; and we do hereby declare the following to be a full, clear, and exact description of the same, reference being had to the accompanying drawings, forming a part of this specification, and to the letters of reference marked thereon.

This invention relates to improvements in apparatus designed for forming pipe from vitreous materials and especially such as are made plastic by heat—glass, for instance; and it has for its object to provide an apparatus which will form perfect pipe, cylindrical in cross-section, if so desired, and with a minimum of labor and attendance.

The invention consists, primarily, in a rotary mold or succession of such molds, each arranged vertically and adapted for the reception of the molten or plastic material from a stationary feed, whereby the mass is distributed in the most perfect manner to secure homogeneity; and, further, the invention consists in providing, in connection with such mold or molds, a longitudinally-movable core, together with a similarly-movable former for shaping the edge of the pipe; and, finally, the invention consists in certain novel details of construction and combinations and arrangements of parts, all as will be now described, and the particular features of novelty pointed out in the appended claims.

Referring to the accompanying drawings, Figure 1 is an elevation of an apparatus embodying our present improvements. Fig. 2 is a vertical section through the mold, the core, and the car upon which the mold is mounted. Fig. 3 is a vertical section through a mold designed for forming curved or corner sections of pipe. Fig. 4 is an elevation of the preferred form of core. Fig. 5 is a top plan view of the core.

Similar letters of reference in the several figures indicate the same parts.

In carrying the invention into practice it is preferable to arrange a plant for the manufacture of the pipe with suitable furnaces for melting the constituent elements of the vitreous material convenient to suitable annealing-furnaces for receiving the formed pipe, the two being connected by a track or way upon which cars or vehicles may be moved for conveying the pipes and molds to and from the melting-furnace.

Referring to the accompanying drawings, Fig. 1, the letter A indicates a spout or discharge-duct for feeding the molten vitreous material from the furnace into the mold, the molten material being maintained at a high temperature by heaters B, arranged in proximity to and with the flames, preferably impinging upon the spout or material traversing the spout.

C indicates a car traveling on a way $c$ and adapted to support a mold, as will be presently described.

Arranged in proximity to the track or way $c$, in position to coöperate with the molds carried by the carriage C, is the mechanism for forming the opening through the pipe and for finishing its end, together with the mechanism for rotating the mold during the time it is receiving the molten vitreous material and the pipe being formed. In Fig. 1 of the drawings we have shown a mechanism arranged somewhat in the manner of a "drill-press" with a suitable vertical frame D, a horizontal arm or support D' for supporting the core and pipe forming device referred to, and a windlass E for raising the working parts above the top of the mold when the mold is to be moved into or out of position. The arm D' is provided at its outer end with bearings $d$, in which a vertical shaft F slides, and is adapted to be rotated by a pulley $f$ keyed thereto, so as to permit of the independent longitudinal movement of the shaft and driven by a belt $f'$ from a pulley $f^2$ on a drive-shaft G. The flexible connection $e$ passes from the windlass E over sheaves and is connected to the upper end of the shaft F. Immediately below the shaft F or in position to hold the carriage C, with its mold H, properly centered for the entry of the core or lower end of the shaft F is a chocking or holding device I of any suitable character—such, for instance, as a vertically-movable yoke adapted to embrace one of the axles of the truck or carriage. The mold H is mounted on said carriage so as to be capable of rotation, for which purpose a relatively-large gear-wheel H' is provided and adapted to mesh with a gear-wheel G' on the lower end of the shaft G. The gear-wheel H' is preferably mounted on antifriction-rollers $h$, which also serve to center or retain the mold in proper position on the carriage, and centrally the said gear-wheel supports the bottom plate $H^2$ of the mold H. This bottom plate $H^2$ is provided with an upwardly-extending central portion or annulus having an external rib or projection $h^2$, which is adapted to be surrounded by the lower end of the mold, said mold being preferably formed in complete halves hinged together at one side by the hinges $H^3$ and adapted to be opened and closed upon the annulus and rib $h^2$.

While the lower end of the shaft F may constitute the core for forming the central opening through the pipe, yet in the preferred construction a special form of core is employed having expansible sections in order to compress the molten vitreous material in the formation of the pipe and to release itself readily as the core is withdrawn after the pipe has been formed. This form of core is illustrated in Figs. 2 and 5 and consists of side sections L, between which side sections are radially-movable sections L', preferably of wedge shape, and adapted when forced outwardly to cause a similar movement of equal extent of the sections L. The several sections are held together at top and bottom by plates $l$, connected thereto by pin-and-slot connections, as shown in Fig. 5, and they are adapted to be spread by means of a vertically-movable wedge-piece M, having inclines $m$ coöperating with similar inclines on the sections L' and connected at its upper end with the lower end of the shaft $F^2$, as shown. The lower end of the wedge M is provided with a nut or enlargement M', which will serve to lift the expansible core-sections when the shaft F is elevated, such movement permitting the said expansible sections to drop down and move inwardly, so as to relieve them from the pressure of the surrounding material.

The upper edge of the annulus $h^2$ serves to form or give shape to the lower edge of the pipe, and where it is desirable to form a flange at one end of the section of pipe this is accomplished by providing the mold-sections H with a suitable chamber or enlargement $H^4$ at the upper end and mounting upon the shaft an independently-movable plunger N, which plunger N, closely surrounding the shaft F, may be forced down into the molten material, giving it the shape illustrated in Fig. 2, and for manipulating the plunger N an operating-handle N' is provided in convenient position for manipulation by an attendant. The handle N', together with the plunger, is limited in its downward movement by a link $n$, and it may be held in its elevated position by the engagement of a loop $n'$ with a hook or other device $n^2$ on the arm D'. The upper end of the pipe or its extreme edge is shaped by a second annular plunger O, which surrounds the plunger N and is preferably of a size to just fit within the enlarged upper end of the mold. The plunger O is also provided with an operating-handle O' and a connection $o$ for limiting its downward movement, together with a loop $o'$, adapted to engage a hook $o^2$ for holding it in its elevated position.

In operation now the carriage, with its mold, is brought into position for the gear-wheel H' to mesh with the gear-wheel G', at which time the mold H will be central beneath the shaft F. The mold-sections have been previously closed and the carriage is secured in its adjusted position. The core is then lowered into position and the mold and core are rotated in opposite directions through the belt-and-gear connections described. Molten material may then be admitted from the supply A, which material, as the mold and core are both being rotated, will not only be passed into the mold in the form of a spiral, but will be evenly distributed by the combined rotary action of the mold and core. The core preferably rotates in a direction opposite to that in which the mold rotates, and, presenting a lesser surface, it naturally follows that the vitreous material partakes of the motion of the mold, and hence a true cylindrical opening through the pipe is insured, even though the cross-sectional contour of the core is slightly irregular. The preferred form of core employed is one having spiral grooves upon it, as shown at P in Fig. 4, and the core is rotated in a direction to cause the spiral to travel downwardly, as it were, thereby forcing the plastic vitreous material downwardly to a certain extent and insuring a dense and uniform body. Sufficient of the molten material having been poured into the mold, the plunger N is depressed by means of its handle N', forming an enlargement in the upper end of the pipe. The plunger N may partake of the motion of the core or not, as desired. It is preferred, however, that it all rotate, for which purpose it is mounted in a sleeve $N^5$. This practically completes the formation of the pipe-section; but inasmuch as it is desirable that the edges should be finished while the mass is still somewhat plastic the plunger O is now depressed and gives the proper form to the upper edge. The lower edge is formed by the annulus $h^2$. The parts are retained in the position last described until the vitreous material is hardened sufficiently to stand careful handling. When it may be handled, the plungers N and O are raised, the core contracted and withdrawn, and the car, with its mold and pipe, moved to a convenient position for opening the mold and removing the pipe-section therefrom. The pipe-section so removed may be placed in a temporary cradle or form and passed into the annealing-furnace for subsequent treatment.

In case it should be desired to make corner-sections of pipe a mold having the proper longitudinal curvature is mounted on the gear-wheel H', as illustrated in Fig. 3. This mold (lettered R) is preferably formed in halves, as is the mold H, the two halves being hinged together at $r$. On one of the halves a segmental support S is provided, in which is journaled, on a center coincident with the center of curvature of the pipe, a segment S', carrying a curved core $S^2$, adapted to pass into the lower end of the mold R and form the internal bore or opening in the pipe. The upper end of this core $S^2$ is preferably somewhat pointed, as at $s$, and surrounding its lower portion or at the lower portion of the mold is an annulus $s'$, preferably adjustable within the mold, whereby the length of the curved section of pipe may be gaged and adapted to form the lower edge of the pipe, as does the annulus $h^2$ in the construction formerly described. The upper end of the mold R is formed with an enlargement in which the enlarged portion or chamber of the pipe may be formed, and plungers $N^6$ and $O^6$, corresponding to the plungers N and O, are employed for forming the said upper end of the pipe-section. The whole mold R, together with the segments S S' and core $S^2$, rotates in unison with the wheel H' in this instance, for it is obvious that the core itself cannot rotate independently of the mold and still maintain a true central position therein.

Having thus described our invention, what we claim as new, and desire to secure by Letters Patent, is—

1. In an apparatus for forming pipe from molten vitreous material, the combination with the rotary mold-support, of a mold adapted to receive the molten material detachably mounted on said support, a plunger arranged to work into and out of said mold and the plungers arranged concentrically of said first-mentioned plunger for forming the pipe end; substantially as described.

2. In an apparatus for forming pipe from molten vitreous material, the combination with a mold-carriage, of a rotary mold therein, a rotating mechanism for said mold mounted in fixed position whereby when said mold-carriage is moved into position for receiving molten material, the rotating mechanism will be brought into operative position, and during the supplying period the mold may be rotated; substantially as described.

3. In an apparatus for forming pipe from molten vitreous material, the combination with a mold-carriage, a rotary mold-base mounted on said carriage and a rotating mechanism for said base mounted in fixed position and adapted to be brought into operative position by the movement of the carriage, of a sectional mold mounted on said base and means for uniting said sectional mold and base during the formation of a section of pipe; substantially as described.

4. In an apparatus for forming pipe from molten vitreous material, the combination with the carriage, the horizontally-arranged gear-wheel journaled thereon and the vertically-arranged mold mounted on said gear-wheel, of a driven gear mounted in fixed position and adapted to be brought into mesh with said gear-wheel on the carriage by the movement of the carriage to the filling position and a core adapted to work longitudinally into and out of the mold when in the filling position; substantially as described.

5. In an apparatus for forming pipe from molten vitreous material, the combination with a carriage, a mold-base journaled to rotate in a horizontal plane thereon and an annulus having an external bead centrally arranged on said mold-base, of a two-part mold adapted to clamp about said annulus whereby it is retained in its vertical position on the mold-base, means for rotating said mold-base and mold, a core adapted to work into and out of the mold and a fixed supply-duct for the molten material whereby said molten material is distributed spirally by the rotation of the mold; substantially as described.

6. In an apparatus for forming pipe from vitreous material, the combination with a movable carriage, a rotary mold-base mounted on said carriage, and a mold carried by said base, of a mold-rotating mechanism and a core-operating mechanism arranged in positions fixed with relation to the movements of said carriage and adapted when said carriage and mold are in position for receiving molten material to be in operative relation to the mold; substantially as described.

7. In an apparatus for forming glass pipe, the combination with the carriage mounted upon a suitable way, of a mold carried by said carriage, mold-rotating and plunger-operating mechanisms mounted in fixed positions with relation to the carriage and adapted when the mold is in receiving position to be in position for coöperating with said mold for rotating the same and forming the central opening through the pipe; substantially as described.

8. In a pipe-forming apparatus, the combination with the carriage, the rotary mold mounted thereon, and mechanism for rotating the same, of the vertically-movable plunger mounted in fixed position with relation to the movement of the carriage and the pipe-end-forming plungers arranged concentrically of said first-mentioned plunger; substantially as described.

9. In a pipe-forming apparatus, the combination with the carriage, the rotary mold mounted thereon and means for rotating said mold, of a rotary vertically-movable core with means for rotating said core in a direction opposite to that in which the mold is rotated and pipe-end-forming plungers arranged concentrically of said core; substantially as described.

10. In a pipe-forming apparatus, the combination with the rotary mold formed in vertical sections, of the rotary core formed in vertical sections with means for expanding and contracting said sections and a vertically-movable plunger connected with said core for contracting and elevating the sections and for lowering and expanding the sections; substantially as described.

11. In a glass-pipe-forming apparatus, the combination with a vertically-movable shaft carrying a core-piece and mounted in fixed bearings and a vertically-arranged rotary shaft gearing with said first-mentioned shaft for rotating the same and carrying a gear-wheel at its lower end, of a carriage, a rotary mold-base mounted on said carriage, and having a gear-wheel adapted to mesh with the gear-wheel on the vertical shaft, a mold mounted on said mold-base in position to be in line with the vertically-movable shaft when the gear on the mold-base and rotary shaft are in mesh, means for holding the carriage in such position, means for operating the vertically-movable shaft vertically; substantially as described.

THOMAS B. HOWE.
CHARLES E. WETMORE.

Witnesses:
Mrs. C. L. HAWLEY,
CHAS. L. HAWLEY.